United States Patent
Vale et al.

[15] 3,680,267
[45] Aug. 1, 1972

[54] WORKPIECE LOADING AND UNLOADING METHOD AND APPARATUS

[72] Inventors: Peter C. Vale; Anthony Palazzola, both of Detroit; Nicolae Grui, Berkley; Raymond F. Nixon, Bloomfield Hills, all of Mich.

[73] Assignee: Carmet Company, Pittsburgh, Pa.

[22] Filed: Feb. 18, 1971

[21] Appl. No.: 116,366

[52] U.S. Cl. ............................51/215 H, 90/11 R
[51] Int. Cl. ..............................................B24b 47/02
[58] Field of Search...51/215 R, 215 H, 235; 83/280, 83/281, 417; 214/1.4; 90/11 R

[56] References Cited

UNITED STATES PATENTS

| | | | |
|---|---|---|---|
| 2,345,648 | 4/1944 | Wolfskill | 51/215 H X |
| 3,552,062 | 1/1971 | Brown | 51/215 H |

*Primary Examiner*—Othell M. Simpson
*Attorney*—Vincent G. Giola and Robert F. Dropkin

[57] ABSTRACT

Method and apparatus for successively moving a plurality of workpieces into position where they can be clamped in place on workpiece processing apparatus and thereafter removed and automatically ejected. The workpieces are preferably fed from a magazine, and preferably one or two at a time, into a V-shaped notch formed in the end of a reciprocable chuck. The chuck is provided with passageways which terminate at the notch and are evacuated such that the workpiece will be held in place by suction. Additionally, a rotatable finger may be employed to help hold the workpiece on the chuck. After the chuck is loaded, it is moved forwardly to a position where it is in alignment with the center line of clamping members on the processing apparatus; the workpiece is clamped; the suction terminated while the finger is rotated out of engagement with the workpiece; and the chuck is retracted. In order to remove the workpiece from the processing apparatus, much the same cycle is repeated, except that the workpiece is ejected from the chuck as it is retracted.

14 Claims, 11 Drawing Figures

INVENTORS.
PETER C. VALE,
ANTHONY PALAZZOLA,
NICOLAE GRUI &
RAYMOND NIXON
By Vincent G. Gioia
Attorney

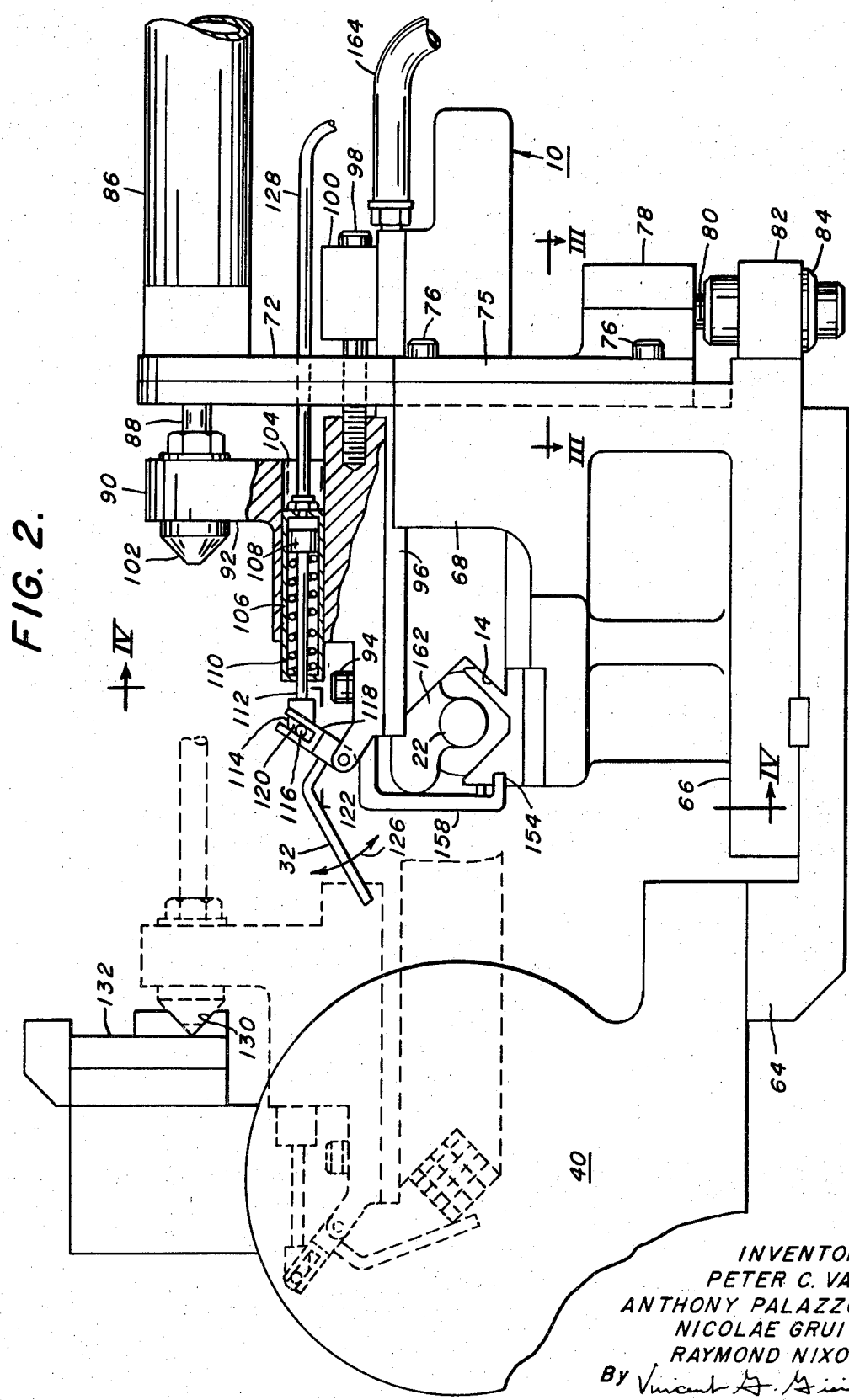

INVENTORS.
PETER C. VALE,
ANTHONY PALAZZOLA,
NICOLAE GRUI &
RAYMOND F. NIXON
By Vincent G. Gioia
Attorney

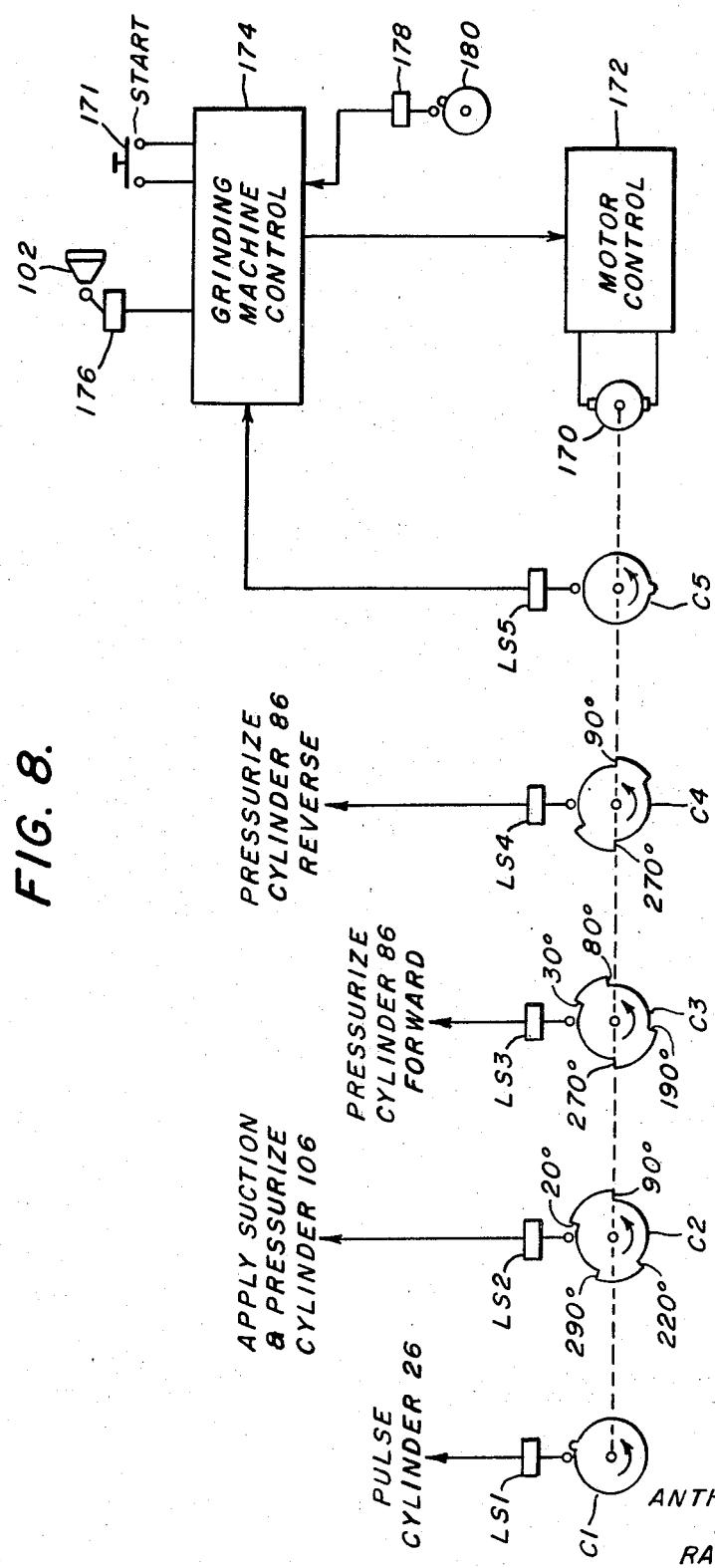

WORKPIECE LOADING AND UNLOADING METHOD AND APPARATUS

BACKGROUND OF THE INVENTION

While not limited thereto, the present invention is particularly adapted for use in loading and unloading workpieces into a machine tool having a headstock and tailstock between which the workpiece is clamped as it is turned or ground. In an automatic grinder for tool inserts, for example, the workpiece is gripped between the clamp spindles mounted on a rocking housing such that the periphery of the workpiece can be moved into contact with a grinding wheel as the workpiece is rotated on the spindles.

In the past, workpieces have been manually loaded and unloaded on a machine of this type. The operator manually locked a locating device onto the aforesaid rocking housing which oriented the insert to the center line of the headstock and tailstock of the grinder. After this orientation, the operator manually locked the insert between two end spindles and removed the locating device, pushed the start button; and from this point the grinding operation commenced. After the grinding operation was completed, the operator had to manually remove a ground workpiece and load a new workpiece to be ground. Needless to say, loading and unloading workpieces in this manner is tedious and requires a great deal of manual labor.

SUMMARY OF THE INVENTION

The present invention provides a method and apparatus for automatically loading and unloading one or a plurality of workpieces sequentially into and from processing apparatus of the type described above.

In accordance with the invention, a reciprocable chuck member is provided having a groove in the forward face thereof, together with means for feeding workpieces one by one into the groove and into alignment with the reciprocable chuck. Suction means are provided for holding a workpiece within the groove. After the workpiece is thus held within the groove by the suction means, the chuck member is moved from its retracted position where the workpiece is loaded into the groove to an extended position where it can be clamped by clamping means on processing apparatus. After the workpiece is thus clamped, the suction means is disabled to release the workpiece from the chuck; whereupon the chuck member is moved back into its retracted position.

After the workpiece is processed, it is moved into a position where it again can be engaged by the groove in the reciprocable chuck member and the chuck member is moved forwardly with the suction means again being activated so as to engage and grip the workpiece which is now released by the clamping means on the processing apparatus. The chuck member is then retracted; and because of the orientation of the workpiece as it is removed from the processing apparatus, it strikes an abutment and is automatically ejected as the chuck member moves backwardly preparatory to receiving a new workpiece; whereupon the cycle is repeated.

Preferably, the workpieces are placed in side-by-side relationship in a V-shaped magazine and are forced by a fluid cylinder device, one or two at a time, against a stop member such that they are in alignment with the groove in the chuck member. In addition to holding the workpieces within the groove by suction, it is preferable in accordance with the invention to provide a finger which rotates from an extended position to a position where it engages the side of a workpiece opposite the groove in the chuck member. This rotatable finger is rotated into a position where it is out of engagement with the workpiece once the workpiece has been engaged by the clamping means on the processing apparatus.

As will be seen, the supply of workpieces can be loaded into the aforesaid magazine and the loading and unloading apparatus automatically cycled in conjunction with the operational cycle of the processing apparatus such that a workpiece will be loaded into the processing apparatus; the processing apparatus cycled; the workpiece removed; and a new workpiece inserted without any attention on the part of an operator.

The above and other objects and features of the invention will become apparent from the following detailed description taken in connection with the accompanying drawings which form a part of this specification, and in which:

FIG. 2 is a side view of the loading and unloading apparatus of the invention, again showing its relationship to an automatic grinding machine;

FIG. 8 is a simplified schematic control system for the apparatus of the invention.

Figure 1:
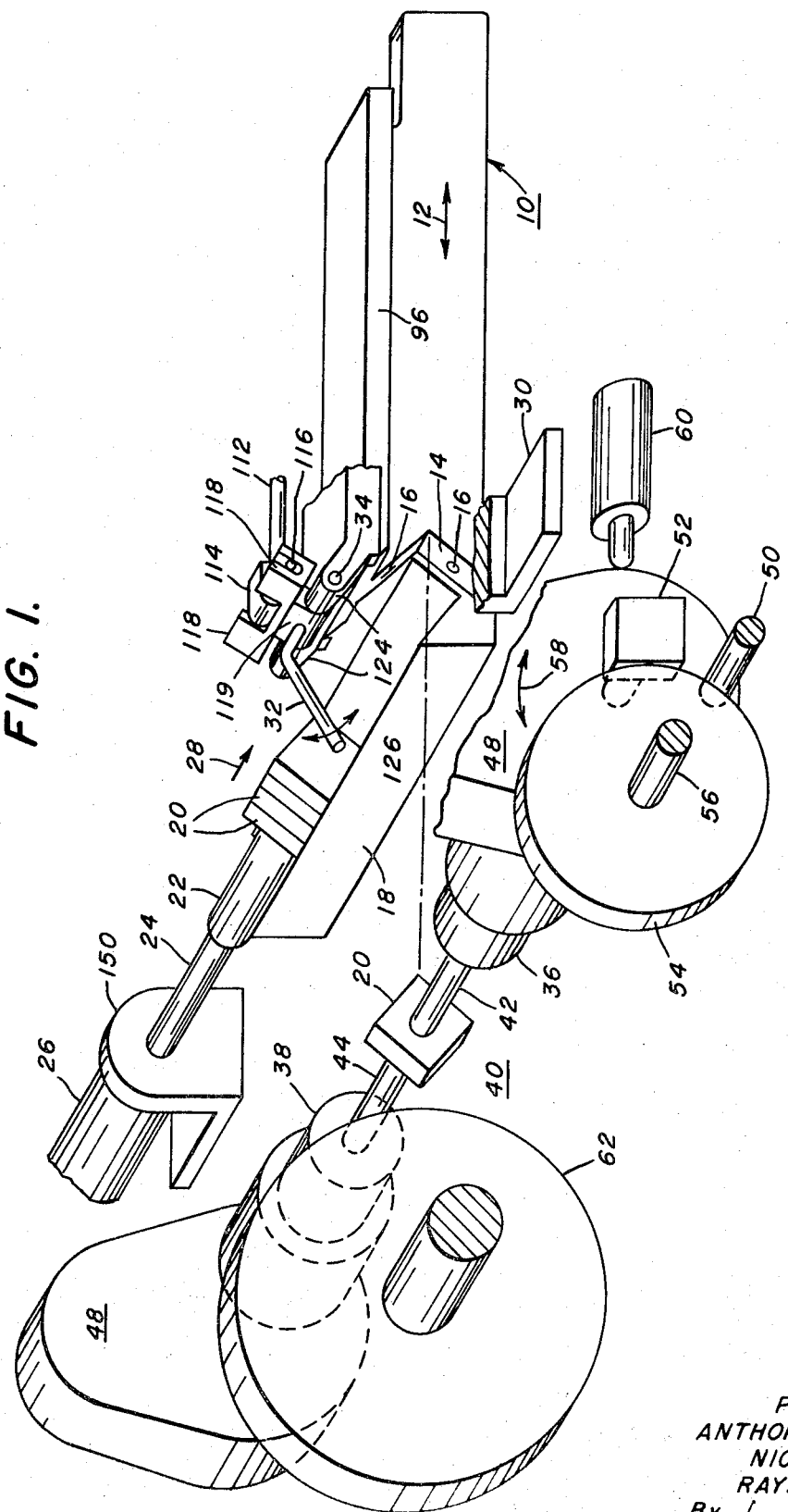
FIG. 1 is a perspective view of a simplified version of the loading and unloading apparatus of the invention, showing its relationship to an automatic grinder.

With reference now to the drawings, and particularly to FIG. 1, there is shown a chuck member 10 having a generally T-shaped cross-sectional configuration and reciprocable along a straight-line path back and forth along the direction of arrow 12. At the forward end of the T-shaped chuck member 10 is a generally V-shaped notch 14 having openings 16 connected through interior passageways (hereinafter described in detail) to a vacuum pump such that suction is created at the openings 16.

The chuck member 10 is shown in FIG. 1 in its retracted position where it is adjacent the end of a V-shaped magazine block 18 which carries a plurality of workpieces 20. In the particular illustration given herein, the workpieces are square in configuration; however they can be any one of a number of different shapes as will hereinafter be explained. The workpieces 20 are pushed along the bottom of the V-shaped magazine 18 by a push rod 22 connected to the end of a piston rod 24 of fluid cylinder 26 which is preferably of the pneumatic type. When the cylinder 26 is pressurized or pulsed momentarily, the workpieces 20 are pushed from left to right along the direction of arrow 28 and into engagement with a stop member 30 which is shown broken away in FIG. 1. The stop member 30 is spaced from the end of the magazine 18 such that the chuck member 10 can slide between the two.

When the workpieces 20 are pushed in the direction of arrow 28 by the cylinder 26, the forward workpiece engages the stop member 30 where it is in alignment with the vertical portion of the chuck member 10. Thereafter, the passageways to which the openings 16 are connected are evacuated such that the workpiece will be held within the V-shaped notch 14 by suction. Additionally, a finger 32 may be moved downwardly about pivot point 34 by a fluid cylinder, hereinafter described in detail. When the finger 32 is thus rotated downwardly, it engages the side of the workpiece 20 opposite the notch 14 and assists in holding the workpiece in place.

After the workpiece is positioned within the notch 14 and held in place by suction and the finger 32, the reciprocable chuck member 10, which carries the finger 32, is moved forwardly until the center line of the workpiece is in alignment with the center line of the headstock 36 and tailstock 38 of automatic grinding apparatus, generally designated by the reference numeral 40. While the invention can be utilized for loading and unloading workpieces for many types of metalworking and the like operations, it is particularly adapted for use in manipulating workpieces for a machine tool, such as a lathe or grinder, having a headstock and tailstock.

When the workpiece is thus positioned in alignment with the headstock and tailstock of the grinding apparatus, one of two spindles 42 is moved forwardly to clamp the workpiece against a stationary spindle 44. After the workpiece is securely clamped in this manner, the openings 16 in the V-shaped notch 14 are disconnected from the vacuum pump to which they were previously connected; and the finger 32 is rotated upwardly whereby the chuck member 10 can be moved backwardly into its retracted position shown in FIG. 1. At this point, the grinding operation is automatically started. The unloading operation is similar except that the workpiece is ejected from notch 14 as member 10 retracts, as will be explained hereinafter.

The particular grinder shown herein schematically illustrates the grinder sold by Harvill-Johnson Corporation of Hazel Park, Michigan and identified as its Model 500. The headstock and tailstock 36 and 38 are connected at their opposite ends to spindle housings 48 which are pivotal about the axes of shaft 50. The headstock 36 is connected, at its end opposite the spindle 42, to a cam 52 which rides on an idler wheel 54 rotatable about a stationary axis 56. The spindle housing 48 and cam 52, which can pivot about axis 50 through a limited extent as indicated by the arrow 58, are urged to rotate in a counterclockwise direction as viewed in FIG. 1 by means of an air cylinder 60. This maintains cam 52 in snug abutting relationship with the idler wheel 54. Therefore, as the headstock and tailstock 36 and 38 are pivoted about shaft 50, the angular position of the workpiece relative to a grinding wheel 62 can be varied. In this manner, the entire periphery of the workpiece 20 can be ground. The foregoing description of the grinder, while abbreviated, will suffice for purposes of the present application since the invention has applicability to any type of machine tool or other processing equipment where a workpiece is inserted into a clamping position, clamped, and thereafter removed at the completion of processing.

Figure 4:
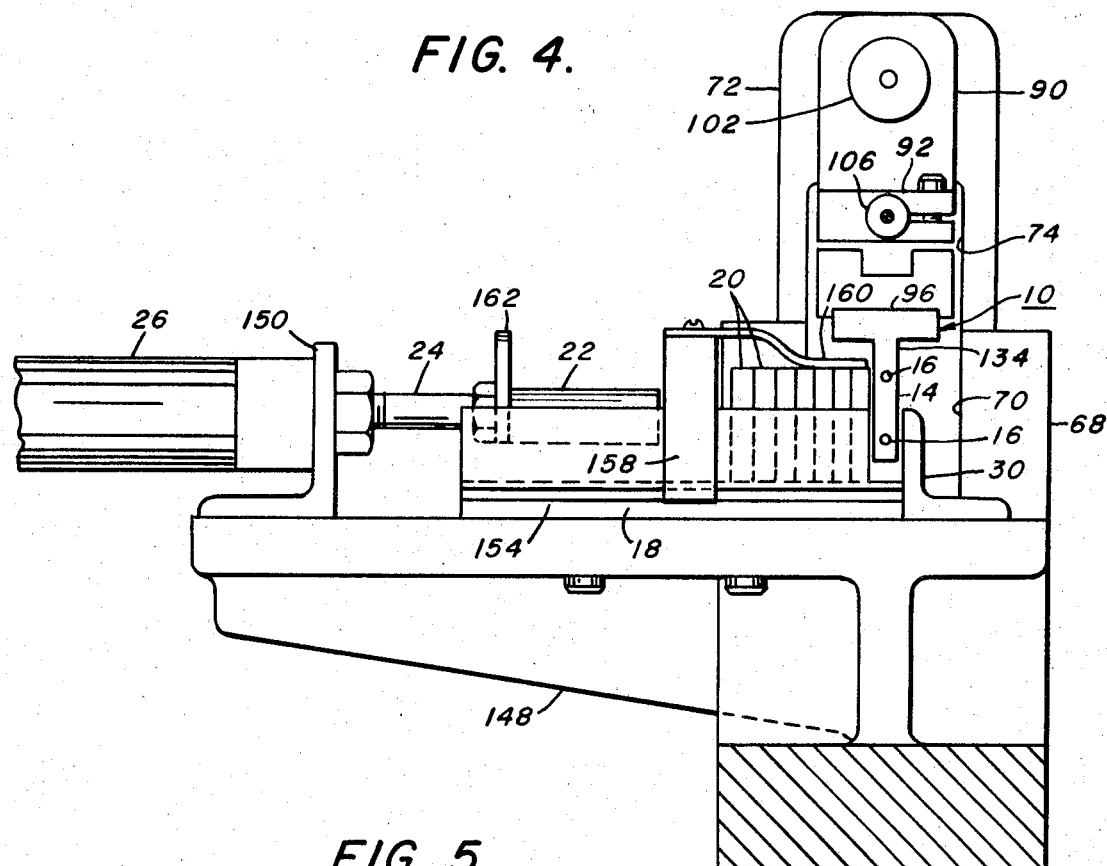
FIG. 4 is an end view of the loading and unloading apparatus of the invention taken substantially along line IV—IV of FIG. 2.
Figure 3:
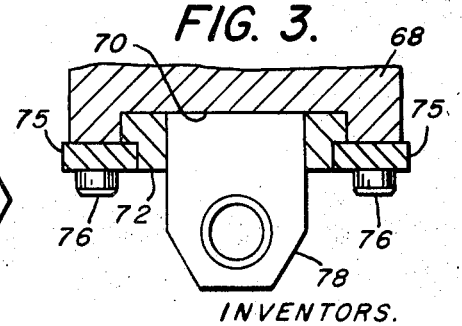
FIG. 3 is a cross-sectional view taken substantially along line III—III of FIG. 2.

The details of the loading and unloading apparatus of the invention are shown in FIGS. 2-6. A mounting plate 64 (FIG. 2) is connected to the underside of the grinder 40 and carries, at its opposite end, a cast bracket 66. The bracket 66 carries, at its rearward end, an upstanding portion 68 having a generally U-shaped opening 70 therein (FIG. 4). As is best shown in FIG. 3, the U-shaped opening 70 and upstanding portion 68 receive a slide 72 which also has a U-shaped opening 74 therein (FIG. 4). The slide 72 is held within the U-shaped opening 70 of upstanding portion 68 by means of a pair of gibbs 75 secured to the casting 66 by means of bolts 76. Projecting outwardly from the slide 72 is a projection 78 (FIGS. 2 and 3) which receives the threaded end 80 of a micrometer adjustment device 82 carried on the casting 66. By rotating the shaft 84 of the micrometer adjustment device 82, the slide 72 can be caused to move upwardly or downwardly between the gibbs 75 in the U-shaped opening 70.

At the top of the slide 72, above the opening 74 therein, is a threaded opening which receives the end of a fluid cylinder 86. The piston rod 88 of the fluid cylinder 86 is connected to an upstanding portion 90 of a clamping bracket 92. The clamping bracket 92, in turn, is secured by means of bolts 94 to the top, horizontal flat portion 96 of the reciprocable chuck member 10. The clamp bracket 92 is provided with slotted openings through which the bolts 94 pass such that the position of the clamp bracket can be varied by rotating a bolt 98 which passes through a block 100 secured to the trailing end of the horizontal portion 96 of chuck member 10. The forward end of the bolt 98 is threaded into the clamp bracket 92 as shown. At the side of upstanding portion 90 opposite the piston rod 88 of the cylinder 86 is a locating pin 102. Since the cylinder 86 is carried on slide 72, and since the piston rod 88 is connected through clamp bracket 92 to the chuck member 10, it will be appreciated that when the cylinder 86 is pressurized in one direction, the piston rod 88 will move to the left as viewed in FIG. 2, carrying with it the clamp bracket 92 and the chuck member 10. Similarly, when the piston rod 88 is retracted, it will carry with it the clamp bracket 92 and chuck member 10.

The clamp bracket 92 is provided with an opening 104 (FIG. 2) which receives a pneumatic cylinder 106 having a piston 108 therein. The piston 108, in turn, is resiliently urged to the right as viewed in FIG. 2 by means of coil spring 110. The piston rod 112 for cylinder 106 is connected at its end opposite piston 108 to a block 114 having pins 116 projecting horizontally outwardly from its sides. The block 114 is positioned between a pair of arms 118 with the pins 116 fitted into U-shaped openings 120 therein. The arms 118, in turn, are pivotally connected at 34 to arms 124 extending outwardly from the base of the clamp bracket 92.

Secured to a block member 119 (FIG. 1) spanning the distance between the two arms 118 is the finger 32 which can rotate about pivot point 34 in the direction of arrow 126. More specifically, when the cylinder 106 is not pressurized, the spring 110 will retract the piston rod 112, thereby causing the arms 118 and the finger 32 to rotate clockwise into the position shown in the drawings. However, when the cylinder 106 is pressurized via conduit 128, the piston 108 and the piston rod 112 will be forced to move to the left as viewed in FIG. 2 against the force of spring 110, thereby rotating the finger 32 downwardly and into engagement with a workpiece, such as workpiece 20 of FIG. 1, positioned within the V-shaped notch 14 in the forward end of the chuck member 10.

Reviewing the operation of the device as thus far described, a workpiece, when positioned within the V-shaped notch 14, is held therein by suction created at the openings 16 (FIG. 1). At the same time, the finger 32 is caused to move downwardly and into engagement with the side of the workpiece opposite the notch 14. Thereafter, the cylinder 86 is pressurized to move the clamp bracket 92 and the chuck member 10 carried thereby forwardly and through the opening 76 in slide 72 until they reach the dotted-line position shown in FIG. 2 where the locating pin 102 enters a notch 130 provided in a block 132 mounted on the frame for the grinding machine 40. The arrangement is such that when the locating pin 102 enters the notch 130 and is seated therein, the center line of the workpiece carried within the notch 14 will be aligned with the center line of the headstock and tailstock of the grinding apparatus. The forward travel of the assembly can, of course, be regulated by loosening bolts 94 and rotating bolt 98 in one direction or the other. Means, not shown, can also be provided for shifting the casting 66 and, hence, the center line of chuck member 10 to the right or left in a horizontal plane.

After the chuck member 10 is moved into the dotted-line position shown in FIG. 2 and aligned with the center line of the headstock and tailstock of the grinding apparatus, the movable spindle 42 forces the workpiece against the stationary spindle 44, thereby clamping the workpiece in place on the grinding apparatus. Thereafter, the pressure applied to cylinder 106 is released, whereby the spring 110 causes the finger 32 to rotate upwardly into the full-line position shown in FIG. 2. At the same time, the vacuum created at openings 16 is released, such that the workpiece is released from the chuck member 10. Finally, the cylinder 86 is pressurized to move elements 92 and 10 back into the full-line position shown in FIG. 1.

Figure 5:
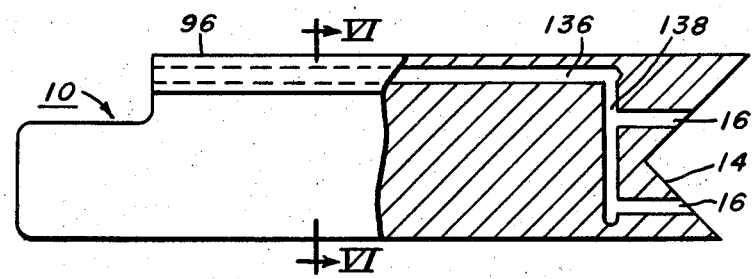
FIG. 5 is a partially broken-away elevational view of the reciprocable chuck member of the invention.
Figure 6:
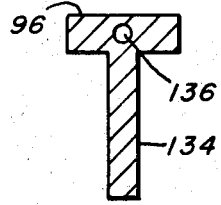
FIG. 6 is a cross-sectional view of the chuck member of FIG. 5 taken substantially along line VI—VI of FIG. 5.

The details of the chuck member 10 are shown in FIGS. 5 and 6. It comprises the upper horizontal portion 96 having a downwardly-depending vertical portion 134 which provides a generally T-shaped cross section. The notch 14 at the forward end of the chuck member is formed in the vertical portion 134 as shown. The horizontal portion 96 is drilled to provide a longitudinal bore 136 which communicates with bore 138 and the passageways 16 which open onto the face of the notch 14.

Figure 7A:
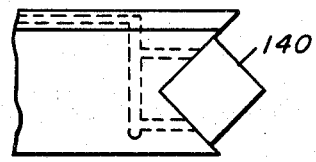
FIGS. 7A–7D illustrate various workpiece shapes which can be processed by the loading and unloading apparatus of the invention.
Figure 7B:
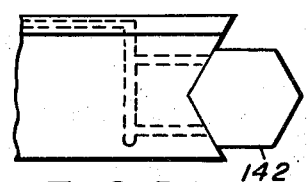
Figure 7C:
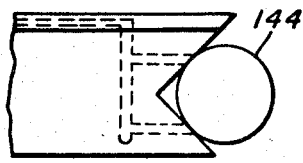
Figure 7D:
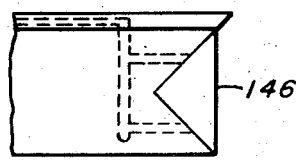

FIGS. 7A–7D illustrate various workpiece configurations which can be handled by the chuck member 10. In FIG. 7A, the workpiece 140 is square; in FIG. 7B, the workpiece 142 is hexagonal in configuration; in FIG. 7C, the workpiece 144 is circular; and in FIG. 7D, the workpiece 146 is triangular in configuration. The shapes shown in FIGS. 7A-7D, however, are intended to be exemplary only. It is, of course, important that the openings 16 engage a surface portion of the edge of the workpiece. In certain cases, the same chuck member 10 can be used for various shapes and sizes of workpieces; however it may be necessary from time-to-time to change the chuck member 10; and this can easily be accomplished since the chuck member 10 is only suspended from the clamp bracket 92 and can be easily connected to it or disconnected therefrom.

Reverting again to FIGS. 2 and 4, and particularly to FIG. 4, the casting 66 is provided with an integral, outwardly extending platform 148 which carries, on its upper surface, the V-shaped magazine 18. The magazine 18 carries the workpieces 20 in side-by-side relationship. The piston rod 24 of the fluid cylinder 26 carried on bracket 150 is connected to the push rod 22 adapted to engage the end of the stack of workpieces 20. Slideable in grooves 154 in the sides of the V-shaped magazine 18 is a generally U-shaped member 158 through which the workpieces 20 can pass. The U-shaped member 158 carries a spring finger or locating blade 160 which is urged into snug abutting relationship with the tops of the workpieces. A trigger 162 is connected to the piston rod 24 in order that the push rod 22 and piston rod 24 can be moved backwardly manually by an operator in order to insert more workpieces into the magazine 18.

In the operation of the loading device, the operator will move the push rod 24 backwardly by pushing the trigger 162 and will thereafter insert a supply of workpieces into the magazine. Then, the operator moves the push rod 22 up into snug abutting relationship with the remainder of the workpieces 20 in the magazine, making certain not to exert enough pressure to overcome the holding force of the spring finger 160 so as to inadvertently force a workpiece against the stop 130 and in alignment with the chuck member 10 when a workpiece is being processed. That is, once a workpiece is inserted into the grinder or other processing equipment, it must be removed before the next workpiece is moved into alignment with the chuck member. When it is desired to move a workpiece into alignment with the chuck member, the cylinder 26 is pulsed, thereby forcing all of the workpieces in the magazine to the right as viewed in FIG. 4 and pushing the first workpiece into alignment with the V-shaped notch 14. This pulsing occurs only when the chuck member 10 is retracted following ejection of a workpiece which has been processed.

The cycle of operation of the machine is as follows. Assuming that the grinding machine or other processing apparatus is ready to receive a new workpiece to be processed, the cylinder 26 is initially pulsed, thereby pushing the workpieces 20 to the right as viewed in FIG. 4 until the furthermost workpiece engages the stop 30 and is in alignment with the notch 14. At this point, the passageways 16 within the chuck member 10 are evacuated via flexible conduit 164 shown in FIG. 2 and cylinder 106 is pressurized to move the finger 32 downwardly and into engagement with the forward end of the workpiece. Thereafter, the cylinder 86 is pressurized to move the clamp bracket 92 and the chuck member 10 carried thereby to the left as shown in FIG. 2 until the locating pin 102 engages the V-shaped notch 130 in block 132. The width of the vertical portion 134 of the chuck member is preferably slightly less than that of a workpiece so that it can pass between magazine 18 and stop 30 while engaging and pushing forward only one workpiece.

With the pin 102 in the notch 130, the center line of the workpiece will be aligned with the center line of the headstock and tailstock 36 and 38 shown in FIG. 2. At this point, the movable spindle 42 (FIG. 1) clamps the workpiece 20 between spindles 42 and 44; whereupon the passageways within the chuck member 10 are disconnected from the vacuum pump and the pressure on piston 108 within cylinder 106 is released. This causes the finger 32 to move upwardly; and since the passageways 16 are no longer evacuated, the workpiece is released from the chuck member. The cylinder 86 is then pressurized in the opposite sense to move the clamp bracket 92 and the chuck member 10 backwardly and into the position shown in FIG. 2.

The grinding machine then goes through its normal cycle of operation; and at the end of the cycle the headstock and tailstock 36 and 38 are rotated into a position, determined by actuation of a cam-operated limit switch hereinafter described, where the workpiece is positioned such that its surfaces will be engaged by the surfaces of the V-shaped notch 14.

Now, the cylinder 86 is again pressurized to move the chuck member 10 and clamp bracket 92 forwardly with the finger 32 raised until the locating pin 102 again enters the notch 130. At this point, the interior passages of the chuck member 10 are evacuated and cylinder 106 is pressurized to move the finger 32 downwardly and into engagement with the opposite side of the workpiece. The cylinder 86 is again pressurized in the opposite direction and the chuck member 10 moves backwardly with the workpiece. As the chuck member 10 moves backwardly and before it reaches its fully-retracted position, the interior passages are disconnected from the vacuum pump, as is the cylinder 106. Consequently, the finger 32 moves upwardly. Additionally, and because of the positioning of the spindles 42 and 44, the workpiece, when it is engaged at the completion of a grinding operation, is off-center with respect to the notch 14. That is, the workpiece, when it is engaged at the completion of a processing operation, is moved slightly to the right (FIG. 4) such that it will engage the stop bracket 30 as the chuck member 10 is retracted. This will insure that the workpiece is ejected regardless of the exact timing of the valves connected to conduits 128 and 164, for example.

The foregoing cycle of operation can be effected by means of cam-controlled switches tied into the normal control of the grinding machine. In this respect, once the workpiece is inserted into the grinding machine and the chuck member 10 retracted, the timing cams will initiate a normal cycle of operation of the grinding machine; and after the normal cycle of the grinding machine is terminated, the unloading cycle of the apparatus will be initiated.

One type of cam-control system which can be utilized in accordance with the invention is shown in FIG. 8. A plurality of cams C1–C5 are connected to a drive motor 170 controlled by motor control circuit 172. Associated with each of the cams C1–C5 is a limit switch LS1-LS5. When the start button 171 of the main grinding machine control 174 is depressed, the grinding machine does not start immediately. Rather, the grinding machine control circuitry activates motor 170 through motor control 172 to rotate the cams C1–C5 in a counterclockwise direction.

As the cams rotate, the cam C1 initially closes limit switch LS1 to pulse cylinder 26. That is, it momentarily opens a valve to admit fluid pressure into the cylinder 26 such that the cylinder will push a workpiece into alignment with the chuck member 10. This may occur, for example, at 5° of rotation of the cams. Thereafter, the cam C2 will cause limit switch LS2 to evacuate the passageways 16 in the chuck member 10 and pressurize cylinder 106 to move the finger 32 downwardly and into engagement with the workpiece. This may occur, for example, after 20° of rotation of the cams and may persist until 90° of rotation have been completed. With the workpiece clamped in place in notch 14, and after 30° of rotation of the cams, limit switch LS3 pressurizes cylinder 86 to cause the chuck member 10 to move forwardly. The pressure applied to the cylinder 86 may be terminated after 80° of rotation of the cams; but the piston rod 88 and locating pin 102 will remain in their extended positions until the cylinder is pressurized in the opposite sense.

When the locating pin 102 enters the notch 130, a limit switch 176 is actuated which, through the grinding machine control 174, causes the movable spindle 42 to clamp the workpiece in place. Thereafter, starting at 90° of rotation of the cams, limit switch LS4 pressurizes cylinder 86 in the opposite direction to cause the chuck member 10 to retract. Finally, at 180° of rotation, limit switch LS5 initiates an automatic grinding cycle of the grinding machine via control circuit 174. At the same time, when the automatic cycle of the grinding machine is initiated, a signal is applied to the motor control 172 to stop the motor 170; and it will be appreciated that at this point the cams have rotated through 180°.

When the automatic grinding cycle of the grinding machine has been completed and the workpiece has been rotated into position where it can again be engaged by the chuck member 10, a limit switch 178 is tripped by a cam 180 connected to the grinding machine to apply a magnetic brake (not shown) to the headstock and tailstock 36 and 38. At the same time, the motor 170 is again energized to rotate the cams C1–C5 in a counterclockwise direction. At 190°, for example, the limit switch LS3 pressurizes cylinder 86 in the forward direction to again move the chuck member 10 forwardly. However, at this time, the chuck member carries no workpiece. At, for example, 220° of rotation of the cam C2, limit switch LS2 is closed to again evacuate the passageways 16 and pressurize cylinder 106. By this time, of course, the V-shaped notch 14 will be in engagement with the sides of the workpiece. When the chuck member again moves forwardly, the locating pin 102 will again enter the notch 130 and trip limit switch 176. After switch 176 is tripped at this time, it initiates a time delay which allows sufficient time for the workpiece to be engaged by the finger 32, whereupon the spindle 42 is retracted to free the workpiece. Now, at 270° of rotation, the limit switch LS4 pressurizes cylinder 86 in the reverse direction, thereby carrying the workpiece backwardly with the chuck member 10; and at about 290° of rotation, the limit switch LS2 opens to cause finger 32 to raise and the suction to be terminated at passageways 16. Consequently, the workpiece will fall downwardly out of the notch 14; and if it does not fall downwardly, it will be ejected by striking the stop bracket 30 as explained above. The succeeding loading cycle is started immediately (i.e., when cam C1 again closes limit switch LS1) with the cams continuing to rotate through 0° to 180° where the automatic grinding machine cycle is again initiated.

Although the invention has been shown in connection with certain specific embodiments, it will be readily apparent to those skilled in the art that various changes in form, arrangement of parts and method steps may be made to suit requirements without departing from the spirit and scope of the invention.

We claim as our invention:

1. In apparatus for loading and unloading workpieces onto and from processing apparatus of the type wherein the workpiece is clamped by clamping means and thereafter processed, the combination of a reciprocable chuck member having a groove in the forward face thereof, means for feeding workpieces into said groove and into alignment with said reciprocable chuck, suction means for holding a workpiece within the groove in said reciprocable chuck member after it is fed therein by said feeding means, means for moving said chuck member from a retracted position where a workpiece is loaded into said groove to an extended position where the workpiece can be clamped by said clamping means of the processing apparatus, means for disabling said suction means after a workpiece held within said groove is clamped by said clamping means, and means for thereafter retracting said chuck member back into its retracted position.

2. The apparatus of claim 1 wherein said means for feeding workpieces into said groove comprises a magazine extending perpendicular to the direction of movement of said chuck member, the end of the magazine being adjacent said groove when the chuck member is in its fully-retracted position, a stop member on the side of said chuck member opposite said magazine, and means for urging a plurality of workpieces arranged in side-by-side relationship on said magazine against said stop member and into alignment with said groove.

3. The apparatus of claim 2 including fluid cylinder means which is pressurized to move workpieces into alignment with said groove, and means for preventing movement of said workpieces into said groove except when said fluid cylinder means is pressurized.

4. The apparatus of claim 1 wherein said groove is generally V-shaped in configuration and said suction means comprises passageways in said chuck member which terminate at the surfaces of said V-shaped groove and are adapted to be connected at their opposite ends to a vacuum pump.

5. The apparatus of claim 1 including finger means positioned above said groove and rotatable downwardly into engagement with the side of a workpiece opposite the side engaged by said groove.

6. The apparatus of claim 5 including means for activating said suction means to hold a workpiece in said groove and for rotating said finger means into engagement with said workpiece after the workpiece is fed into said groove.

7. The apparatus of claim 6 including means for disabling said suction means and for rotating said finger out of engagement with said workpiece after the workpiece is clamped by said clamping means and before said chuck member is retracted.

8. The apparatus of claim 1 including means for moving said chuck member from its retracted to its extended position without a workpiece in said groove after a workpiece has been processed by said processing apparatus, means engaging a processed workpiece in said groove while the chuck member is in its extended position, and means for thereafter retracting said chuck member.

9. The apparatus of claim 8 including means for ejecting the processed workpiece from said groove while the chuck member is being retracted.

10. The apparatus of claim 1 including a locating pin connected to and reciprocable with said chuck member and engageable with a stop member on said processing apparatus to prevent further movement of the chuck member toward the processing apparatus.

11. In the method for loading and unloading workpieces into and from processing apparatus of the type wherein the workpiece is clamped by clamping means and thereafter processed, the steps of feeding a workpiece into a notch formed in the forward end of a chuck member reciprocable toward and away from the processing apparatus, evacuating passageways terminating at the notch to hold the workpiece within the notch, moving the reciprocable member toward the processing apparatus until the workpiece is in position to be clamped by the processing apparatus, clamping the workpiece to the processing apparatus while terminating evacuation of said passageways to release the workpiece from the notch, retracting said chuck member, and initiating a processing cycle of said processing apparatus.

12. The method of claim 11 including the steps of moving said chuck member toward said processing apparatus at the termination of its processing cycle until said notch engages the workpiece, again evacuating said passageways to hold the processed workpiece within the notch, unclamping said workpiece from the processing apparatus, and again retracting said chuck member and the workpiece held within said notch.

13. The method of claim 11 including the step of mechanically engaging a workpiece to hold it within said notch when said passageways are evacuated.

14. The method of claim 12 including the step of ejecting a processed workpiece from said notch as the chuck member is retracted following a processing operation.

* * * * *